June 30, 1925.  1,544,449
C. HAARBERG ET AL
MEASURING FAUCET
Filed May 3, 1923  2 Sheets-Sheet 1
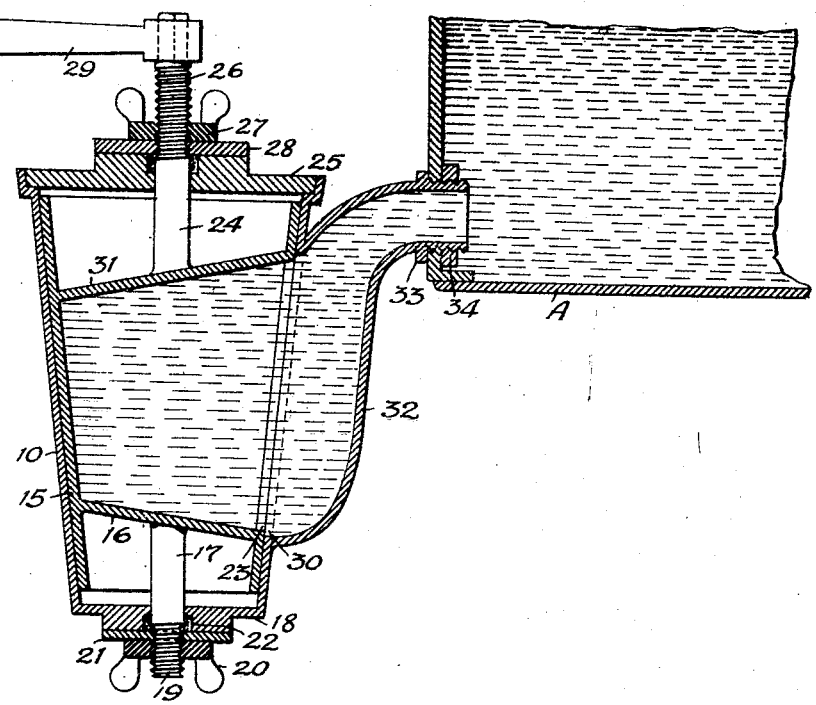
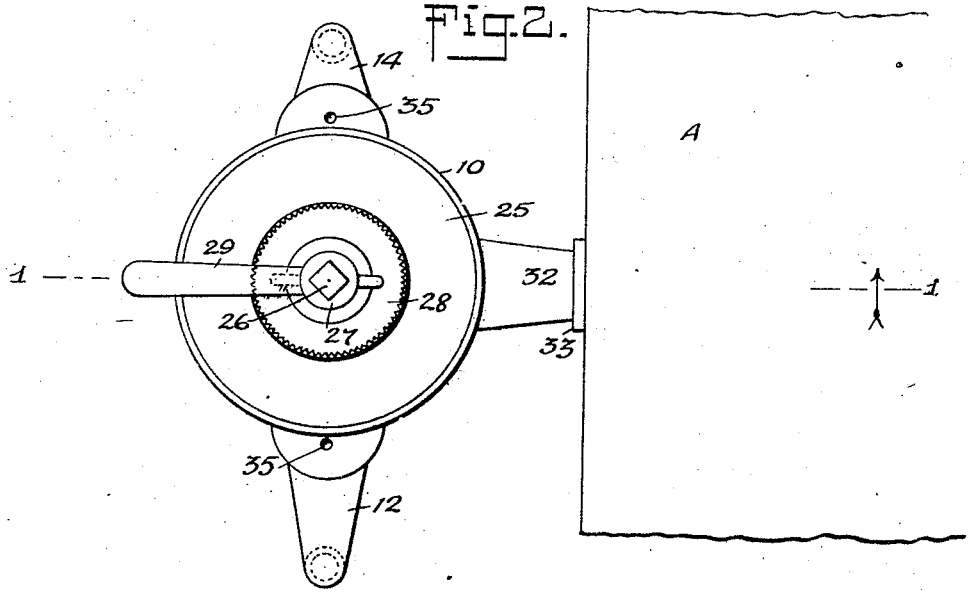
WITNESSES
INVENTOR
CATO HAARBERG
CHRISTIAN HAARBERG
BY
ATTORNEYS

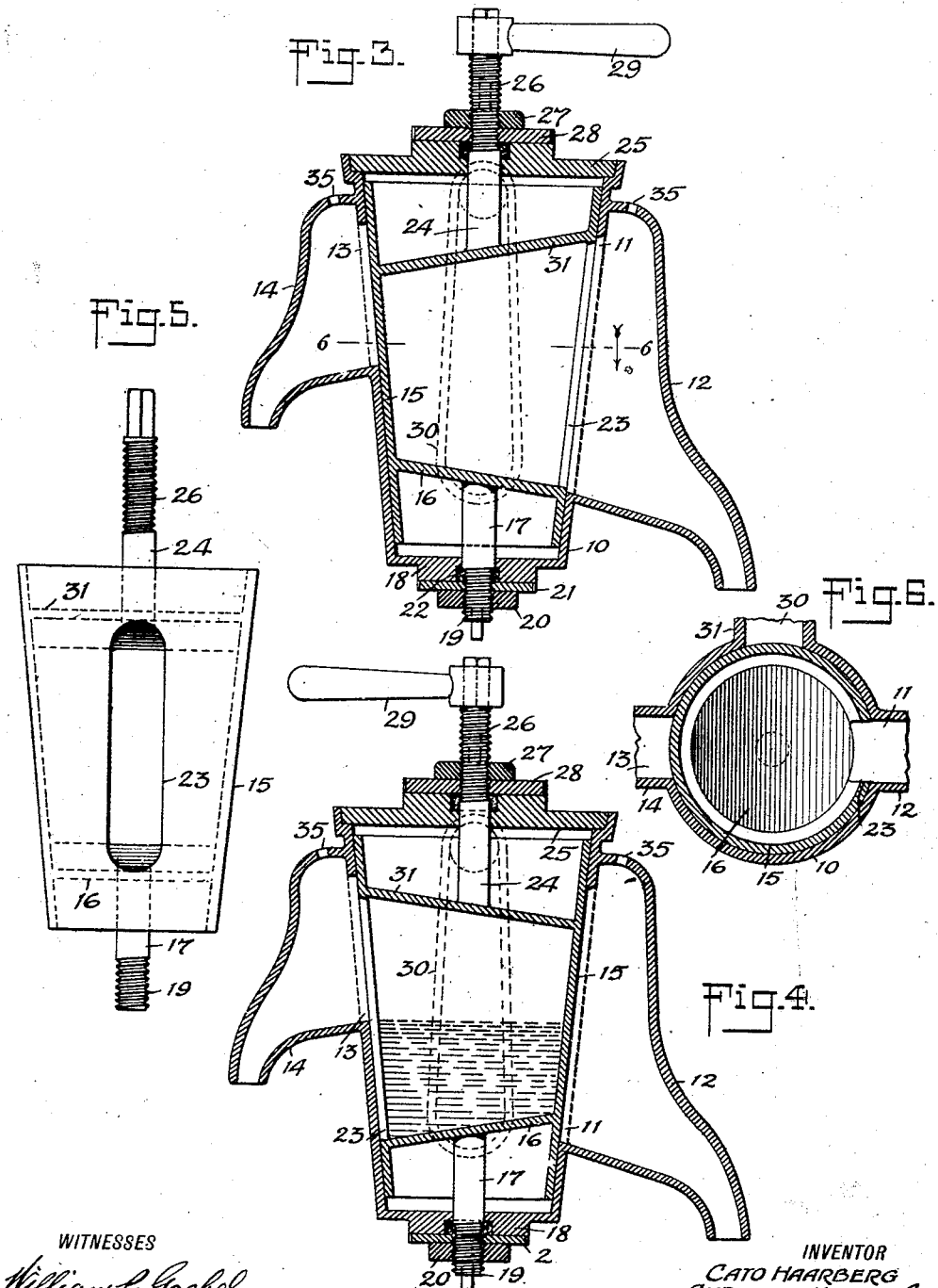

Patented June 30, 1925.

1,544,449

UNITED STATES PATENT OFFICE.

CATO HAARBERG, OF FOX LAKE, ILLINOIS, AND CHRISTIAN HAARBERG, OF TRONDHJEM, NORWAY.

MEASURING FAUCET.

Application filed May 3, 1923. Serial No. 636,450.

*To all whom it may concern:*

Be it known that we, CATO HAARBERG and CHRISTIAN HAARBERG, respectively, citizens of the United States and of Norway, and residents, respectively, of Fox Lake, in county of Lake and State of Illlinois, and of Weidemanns 13, Trondhjem, Norway, have invented new and Improved Measuring Faucets, of which the following is a description.

Our invention relates to a faucet for dispensing various liquids, such for example as oil, kerosene, gasoline, etc., sold by the gallon or half-gallon and more particularly the invention relates to a faucet for measuring predetermined quantities of liquid.

The general object of our invention is to provide a simple faucet that will accurately measure and dispense different predetermined quantities of a liquid by a simple turning movement of the faucet plug to cause either of a plurality of discharge spouts to be brought into position for use without making provision for adjusting the faucet to receive varying quantities of the liquid.

Reference is to be had to the accompanying drawings forming a part of this specification, it being understood that the drawings are merely illustrative of one example of the invention.

Figure 1 is a vertical section of a faucet embodying our invention showing the same affixed to a tank illustrated in part, the plane of the section being indicated by the line 1—1, Figure 2;

Figure 2 is a plan view of the faucet, a portion of the tank being conventionally indicated;

Figure 3 is a vertical section of the faucet in a plane at right angles to Figure 1 and with the hollow valve or plug of the faucet positioned to discharge the larger quantity of liquid;

Figure 4 is a view similar to Figure 3 but with the hollow plug of the faucet turned through 180° from the position shown in Figure 3;

Figure 5 is a side elevation of the hollow plug of the faucet;

Figure 6 is a horizontal section on the line 6—6 of Figure 3.

In carrying out our invention in practice in accordance with the illustrated example, a tapering tubular shell or body 10 is provided having at one side thereof an oblong discharge slot 11 leading to a spout 12. The body or shell 10 has a second shorter discharge slot 13 advantageously diametrically opposite to the slot 11 and leading to a discharge spout 14. The slot 13 has the bottom thereof in the transverse plane bisecting the slot 11 at its center.

Fitted in the shell 10 is a tapered hollow faucet plug 15 from the under side of the bottom 16 of which depends a stud 17 extending through the bottom 18 of the shell 10, the lower end of said stud being threaded as at 19 and receiving a nut 20 and a washer 21. The bottom 10 may as shown have a recess 22 to receive packing.

A slot 23 is formed in the plug 15 and said plug is hollow to form therein a container chamber between the bottom 16 and the top 31. From the top 31 rises a spindle 24 extending upwardly through the closure cap 25 of the top of shell 10, said spindle being threaded as at 26 and receiving a nut 27 and washer 28 above the cap 25. The extreme upper end of the spindle 24 is squared to receive a handle 29 for turning plug 15.

The shell 10 has a third slot 30 constituting the inlet to the faucet, there being provided an integral fitting 32 on said shell at said opening 30 and terminating in a horizontal nipple adapted to enter a side of the tank A or other container holding a supply of oil or the like to be dispensed. The fitting 32 is shown with a collar 33 at the outside of the tank A and with a clamping nut 34 on said fitting at the interior of the tank to tightly secure the faucet to the tank.

With a faucet constructed as described the plug 15 through the medium of the handle 29 may be turned to present the slot 23 of said plug into register with the inlet slot 30 of shell 10 to allow a liquid to enter the plug of the top 31 whereupon either the full quantity of liquid in the plug may be dispensed or half the quantity according to whether the slot 23 of plug 15 is brought into register with the slot 11 or with the slot 13. We thereby avoid all complicated means to vary the container chamber of the faucet to dispense different quantities of liquid and we greatly simplify the construction of measuring faucets and at the same time provide a strong and durable structure. Moreover, the operation of dispensing a smaller or a larger quantity of liquid is simplified, it being only necessary to turn the handle 29, toward the smaller spout 14 to discharge the smaller quantity of liquid, or toward the larger spout 12 for discharging the larger quantity of liquid measured by the full capacity of the container chamber of the plug 15.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. A measuring faucet comprising a shell having an inlet opening and having two discharge openings, the bottoms of which discharge openings are at different heights, spouts on said shell at the respective openings, and a plug fitting in said shell and turnable therein, said plug having an opening adapted by the turning of the plug to be brought into register in succession with the inlet opening of the shell and then with either of the discharge openings of said shell for dispensing.

2. A measuring faucet comprising a shell having an inlet opening, means on the shell at said opening to secure the faucet to a container vessel for receiving liquid from the latter, said shell having discharge openings, the bottoms of which are at different heights, larger and shorter spouts on said shell at the respective discharge openings, a plug in said shell, said plug being hollow to form a container chamber and having an opening at a side to permit liquid to pass into and from said container chamber, spindles on the plug at the top and bottom extending respectively through the top and bottom of the shell, nuts on said spindles, and a handle on one of said spindles for turning the plug to bring the side openings thereof into register with the inlet opening of the shell or with either of the discharge openings thereof.

3. A measuring faucet comprising a shell having an inlet opening, means to secure the faucet to a container vessel to permit inflow of liquid through said inlet opening, said shell having separate discharge openings the bottoms of which are at different heights on the shell, spouts on the shell at the respective openings, a plug turnable in said shell and having a container chamber and an opening in the side of the chamber to permit liquid to pass into and from said chamber, and means to turn said plug to bring the opening thereof into register with any one of the openings of the shell.

4. A measuring faucet comprising a shell, spouts on the shell at different heights, a plug turnable in said shell and having a container chamber, said shell having means to permit inlet of liquid thereto to the chamber and having means to permit outflow of liquid at different heights to the respective spouts for dispensing different measured quantities of the liquid.

5. A measuring faucet having a body and a turnable plug therein having a container chamber adapted to receive a supply of liquid to be dispensed, said body having two discharge openings at different heights to permit outflow of liquid from the said container chamber at different heights to dispense different measured quantities of the liquid; together with a spout at each opening to discharge the liquid at either of the different heights.

6. A measuring faucet having a body and a turnable plug therein having a container chamber adapted to receive a supply of liquid to be dispensed, said body having means to permit outflow of liquid from the said container chamber at different heights to dispense different measured quantities of the liquid, said means controllable by the turning of said plug and said means including exterior spouts at the respective discharges of the said means.

CATO HAARBERG.
CHRISTIAN HAARBERG.